(12) United States Patent
Hwang et al.

(10) Patent No.: US 11,830,997 B2
(45) Date of Patent: Nov. 28, 2023

(54) SECONDARY BATTERY AND BATTERY MODULE HAVING THEREOF

(71) Applicant: SK Innovation Co., Ltd., Seoul (KR)

(72) Inventors: Dong Ha Hwang, Daejeon (KR); Seok Min Kim, Daejeon (KR); Myeong Hwan Ma, Daejeon (KR); Seo Roh Rhee, Daejeon (KR); Hae Ryong Jeon, Daejeon (KR); Seung Hoon Ju, Daejeon (KR); Yang Kyu Choi, Daejeon (KR)

(73) Assignee: SK ON CO., LTD., Seoul (KR)

( * ) Notice: Subject to any disclaimer, the term of this patent is extended or adjusted under 35 U.S.C. 154(b) by 155 days.

(21) Appl. No.: 16/936,843

(22) Filed: Jul. 23, 2020

(65) Prior Publication Data
US 2021/0028519 A1    Jan. 28, 2021

(30) Foreign Application Priority Data

Jul. 23, 2019    (KR) .................. 10-2019-0088779

(51) Int. Cl.
| | |
|---|---|
| *H01M 10/6554* | (2014.01) |
| *H01M 10/613* | (2014.01) |
| *H01M 10/04* | (2006.01) |
| *H01M 10/42* | (2006.01) |
| *H01M 50/10* | (2021.01) |

(Continued)

(52) U.S. Cl.
CPC ... *H01M 10/6554* (2015.04); *H01M 10/0413* (2013.01); *H01M 10/0436* (2013.01); *H01M 10/4207* (2013.01); *H01M 10/613* (2015.04); *H01M 50/10* (2021.01); *H01M 50/20* (2021.01); *H01M 50/531* (2021.01)

(58) Field of Classification Search
None
See application file for complete search history.

(56) References Cited

U.S. PATENT DOCUMENTS

| | | | |
|---|---|---|---|
| 11,476,516 B2 * | 10/2022 | Choi ................. | H01M 10/6555 |
| 2012/0301773 A1 * | 11/2012 | Roepke ................. | H01M 50/20 |
| | | | 429/120 |

(Continued)

FOREIGN PATENT DOCUMENTS

| | | |
|---|---|---|
| CN | 108475831 A | 8/2018 |
| CN | 109643768 A | 4/2019 |

(Continued)

OTHER PUBLICATIONS

Office Action for the Chinese Patent Application No. 202010718809.3 issued by the Chinese Patent Office dated Jun. 29, 2023.

*Primary Examiner* — Alix E Eggerding
(74) *Attorney, Agent, or Firm* — IP & T GROUP LLP

(57) ABSTRACT

A secondary battery may include a cell body member accommodating an electrode assembly therein; and a heat conductive member disposed between the cell body member and a cooling plate member to form a heat path for transferring heat from the cell body member, wherein the heat conductive member is in contact with the cooling plate member, and wherein a contact area of the cooling plate member and the heat conductive member is smaller than a cross-sectional area of the cell body member parallel to a thickness direction of the electrode assembly.

14 Claims, 6 Drawing Sheets

(51) Int. Cl.
    *H01M 50/20*      (2021.01)
    *H01M 50/531*    (2021.01)

(56) References Cited

U.S. PATENT DOCUMENTS

| | | | |
|---|---|---|---|
| 2017/0040652 A1* | 2/2017 | Tasai | H01M 10/6551 |
| 2018/0331336 A1 | 11/2018 | Choi et al. | |
| 2018/0375077 A1 | 12/2018 | Shin et al. | |
| 2019/0074560 A1 | 3/2019 | Reimer et al. | |
| 2019/0237832 A1* | 8/2019 | Ju | H01M 10/613 |
| 2019/0393570 A1* | 12/2019 | Melack | H01M 10/0481 |
| 2021/0288365 A1* | 9/2021 | Lee | H01M 50/105 |

FOREIGN PATENT DOCUMENTS

| | | | | |
|---|---|---|---|---|
| DE | 102014201220 | * | 7/2015 | H01M 10/655 |
| KR | 10-2016-0063837 A | | 6/2016 | |
| KR | 10-2018-0085456 A | | 7/2018 | |
| WO | WO-2018117654 A1 | * | 6/2018 | H01M 10/04 |

\* cited by examiner

SECONDARY BATTERY AND BATTERY MODULE HAVING THEREOF

CROSS-REFERENCE TO RELATED APPLICATION(S)

The application claims benefit of priority to Korean Patent Application No. 10-2019-0088779 filed on Jul. 23, 2019 in the Korean Intellectual Property Office, the disclosure of which is incorporated herein by reference in its entirety.

BACKGROUND

1. Field

The present disclosure relates to a secondary battery and a battery module including the same.

2. Description of Related Art

With increased demand for mobile devices, electric vehicles, and the like, along with the development of related technologies, demand for a secondary battery as an energy source has rapidly increased. A secondary battery may be repeatedly charged and discharged as conversion between chemical energy and electrical energy is reversible in a secondary battery. A cell body member of a secondary battery refers to a laminated film case for protecting an electrode assembly of an anode, a cathode, a separation film, and an electrolyte solution, which are the main components of a secondary battery.

However, such an electrode assembly generates heat while undergoing the process of charging and discharging, and a temperature rise due to the generated heat deteriorates performance of the secondary battery.

Accordingly, the cell body member in which the electrode assembly is accommodated is configured such that a cooling plate member for cooling, a heat sink, and the like, are connected thereto.

However, there may be a problem that a shape of the cell body member cooled in connection with a conventional cooling plate member and heat sink and a shape of a heat conductive member capable of mediating the cell body member and the cooling plate member do not achieve optimal cooling performance.

In this regard, there may also be a problem that production costs increase due to employing expensive heat-conducting members portions of which are not used to conduct heat.

Therefore, there is an increasing need for a secondary battery and a battery module including the same to solve the above problems.

SUMMARY

An aspect of the present disclosure is to provide a secondary battery capable of optimally achieving cooling performance without wasting cost or material of a heat conductive member, and a battery module including the same.

According to an example embodiment of the present disclosure, a secondary battery may include a cell body member accommodating an electrode assembly therein and provided adjacently to a cooling plate member; and a heat conductive member provided between the cell body member and the cooling plate member to form a heat path for transferring heat from the cell body member and provided to be in contact with the cooling plate member with a contact area smaller than a cross-sectional area of at least a portion of the cell body member in a thickness direction.

In this case, an effective contact area percentage, a percentile ratio of a contact area of the cooling plate member and the heat conductive member, may be 30$ to 70% with respect to a cross-sectional area of the cell body member of a secondary battery parallel to the thickness direction.

Specifically, an effective contact area percentage is defined as a percentile ratio of the contact area of the cooling plate member and the heat conductive member to the cross-sectional area of the cell body member of the secondary battery which is parallel to the thickness direction of the electrode assembly 12. According to an embodiment, the effective contact area percentage may be 35% to 50%.

In detail, a portion of the cell body member of the secondary battery according to an example embodiment which is adjacent to the cooling plate member 21 may include a tapered portion having a form in which a cross-sectional area parallel to the thickness direction decreases toward one end of the tapered portion adjacent to the cooling plate member; and a contact area portion provided at the one end of the tapered portion and forming a smallest cross-sectional area parallel to the thickness direction.

In addition, the heat conductive member of the secondary battery according to an example embodiment may be in contact with the contact area portion and may be formed to have a surface area the same as a surface area of the contact area portion.

The heat conductive member of the secondary battery according to an example embodiment may be formed to have a constant thickness until reaching the cooling plate member while having the same cross-sectional area as the contact area portion.

The heat conductive member of the secondary battery according to an example embodiment may be in contact with a central portion of one end of the cell body portion, adjacent to the cooling plate member.

Further, the cell body member of the secondary battery according to an example embodiment may have a thickness percentile ratio with respect to a height of 5% to 25%.

Specifically, the cell body member of the secondary battery according to an example embodiment may have a thickness percentile ratio with respect to a height of 7.5% to 10%.

A battery module according to another example embodiment may include a cell body member accommodating an electrode assembly therein, and a heat conductive member provided between the cell body member and a cooling plate member; and a housing member including the cooling plate member for exchanging heat with the cell body member mediated by the heat conductive member and accommodating a plurality of the secondary batteries, wherein the heat conducive member is in contact with the cooling plate member with a contact area smaller than a cross-sectional area of at least a portion of the cell body member in a thickness direction.

The cell body member of the battery module according to another example embodiment may include a tapered portion having a form in Which a cross-sectional area parallel to the thickness direction decreases toward one end of the tapered portion in contact with the cooling plate member; and a contact area portion provided at the one end of the tapered portion and forming a smallest cross-sectional area parallel to the thickness direction.

In this case, the housing member may be provided with the cooling plate member at least in a bottom portion.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
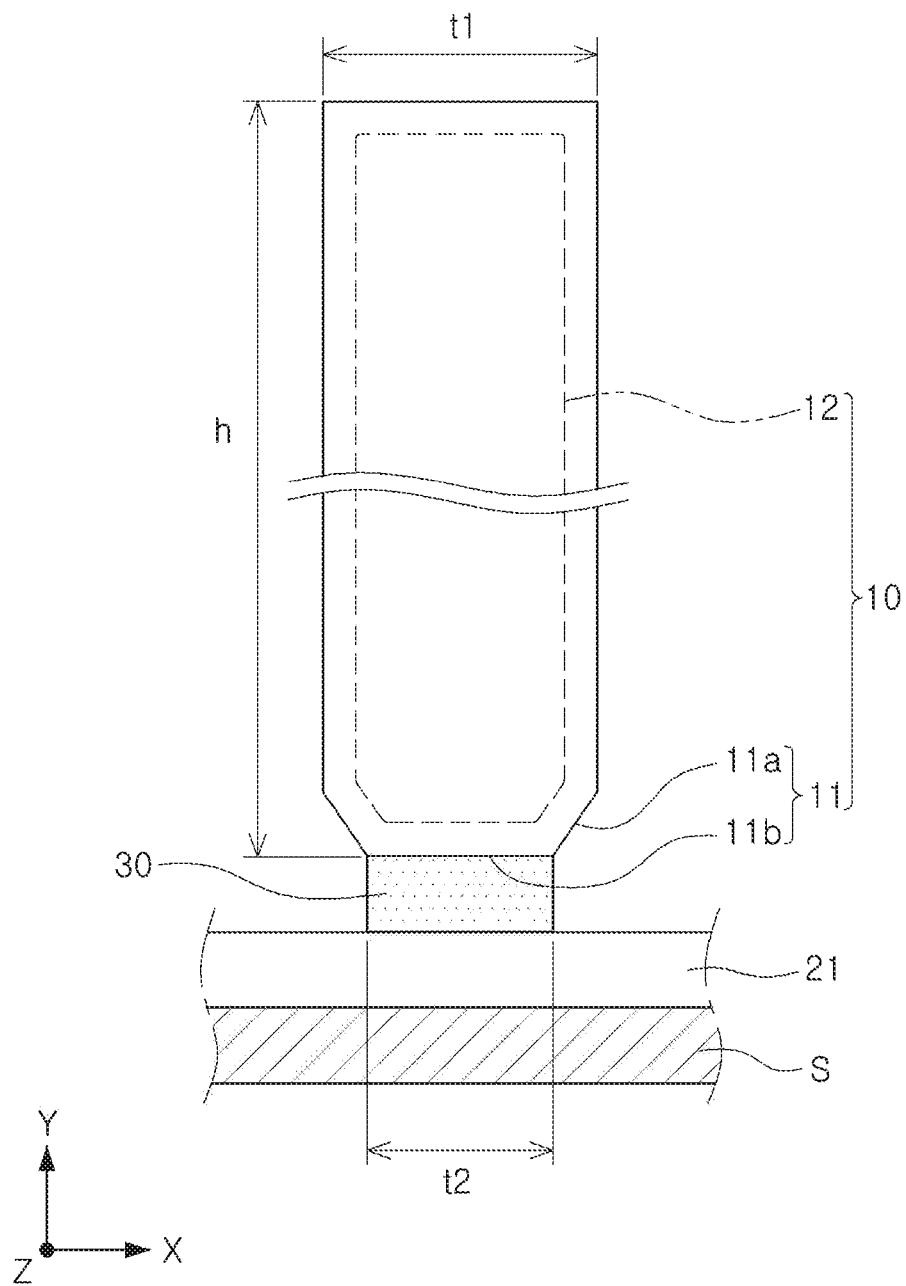
FIG. 1 is a cross-sectional view of a secondary battery of the present disclosure.

Hereinafter, example embodiments of the present disclosure will be described with reference to the accompanying drawings. The present disclosure is not limited to example embodiments, and it is to be understood that modifications can be made without departing from the spirit and scope of the present disclosure. Shapes and sizes of the elements in the drawings may be exaggerated for clarity of description.

In addition, an expression used in the singular encompasses the expression of the plural, unless it has a clearly different meaning in context. Identical or corresponding elements will be given the same reference numerals.

The present disclosure relates to a secondary battery 10 and a battery module including the same, which can optimally achieve cooling performance without wasting cost or material of a heat conductive member 30.

In other words, the secondary battery 10 and the battery module including the same are suggested to be designed to have minimized usage of the heat conductive member 30 while maintaining a cooling effect and cooling performance as compared to a conventional secondary battery and a battery module including the same.

Figure 2:
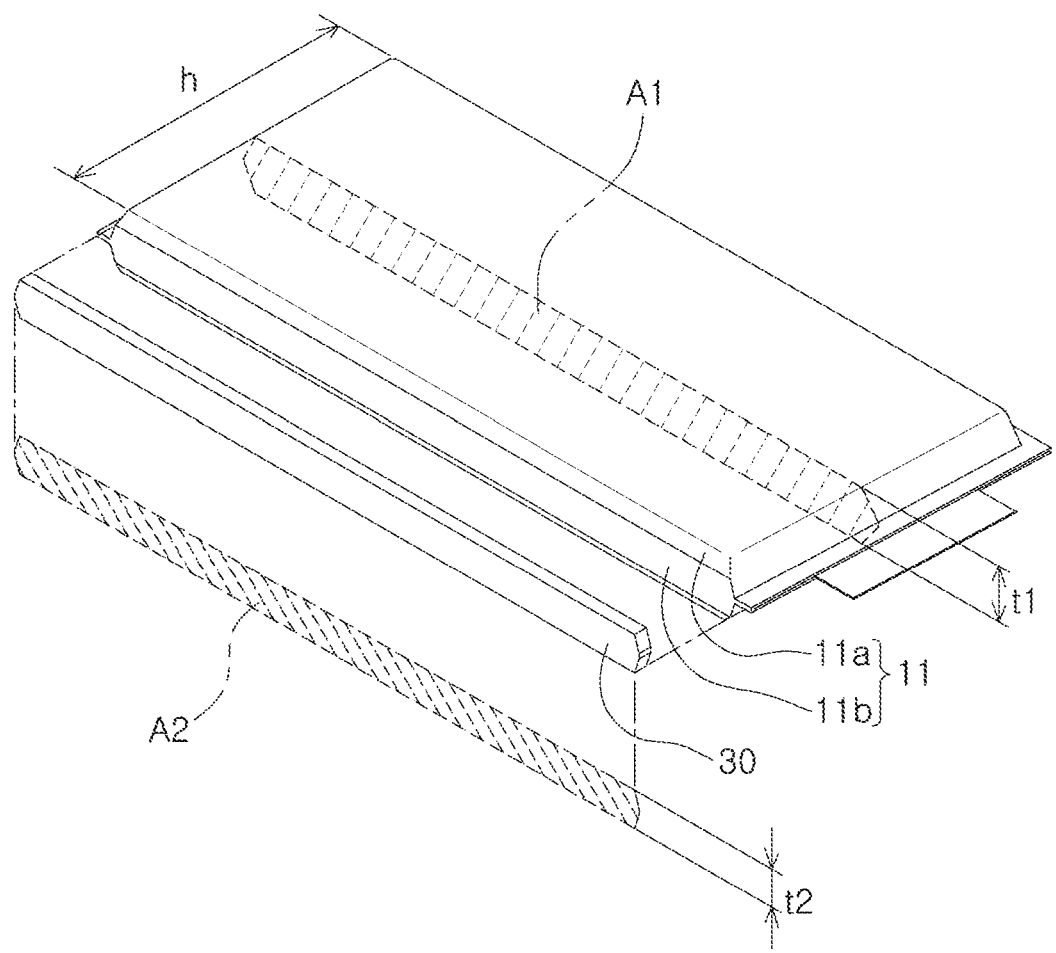
FIG. 2 is a perspective view of a secondary battery of the present disclosure.
Figure 3:
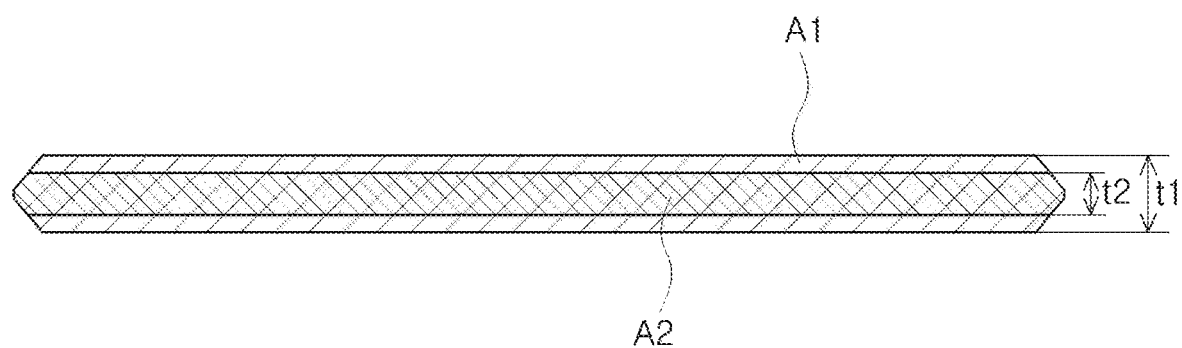
FIG. 3 is a diagram comparatively illustrating an overlap of a contact area of a heat conductive member and a maximum cross-sectional area of a cell body member of FIG. 2.

Specifically with respect to the accompanying drawings, FIG. 1 is a cross-sectional view of the secondary battery 10 of the present disclosure, and FIG. 2 is a perspective view of the secondary battery 10 of the present disclosure while FIG. 3 is a diagram comparatively illustrating an overlap of a contact area A2 of a heat conductive member 30 and a maximum cross-sectional area A1 of a cell body member 11 of FIG. 2.

Figure 4:
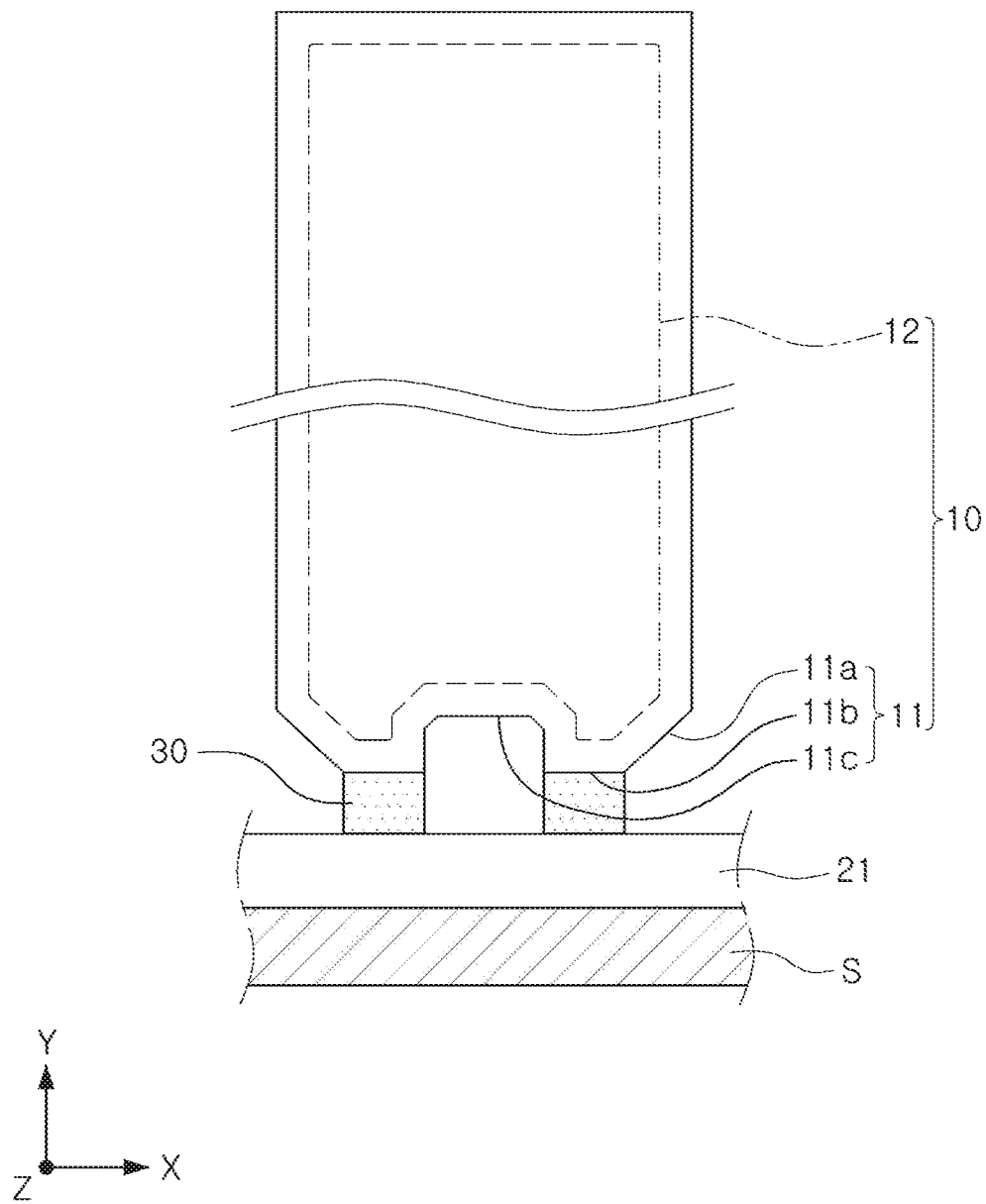
FIG. 4 is a cross-sectional view of another example embodiment of a cell body member of a secondary battery.

FIG. 4 is a cross-sectional view of another example embodiment of the cell body member 11 of the secondary battery 10.

Referring to FIGS. 1 to 4, a secondary battery 10 may include a cell body member 11 accommodating an electrode assembly 12 therein; and a heat conductive member 30 provided between the cell body member 11 and the cooling plate member 21 to form a heat path for transferring heat from the cell body member 11 and provided to be in contact with the cooling plate member 21 with a contact area A2 smaller than a cross-sectional area A1 of at least a portion of the cell body member 11 in the thickness direction of the electrode assembly X. The electrode assembly 12 as shown in FIG. 1 may have a generally rectangular prism shape extending in a thickness direction X, a height direction Y and a length direction Z.

In other words an amount of a heat conducting material is reduced as compared to a case in which the contact area A2 is formed to be the same as the maximum cross-sectional area A1 of the cell body member 11 parallel to the thickness direction by forming the contact area A2 of the heat conductive member 30 to be smaller than a maximum cross-sectional area A1 of the cell body member 11 parallel to the thickness direction X.

The cell body member 11, provided with the electrode assembly 12 therein, may serve to protect the same. That is, the cell body member 11 may provide an internal space accommodating the electrode assembly 12 formed of an anode, a cathode, a separation film, an electrolyte solution, and the like, followed by sealing the same.

As an example, the cell body member 11 may be provided as a pouch-type member or a can-type member. The pouch-type member is a form in which the electrode assembly 12 is accommodated on three surfaces, that is, a member configured to be in the form in which the electrode assembly 12, while being accommodated inside, is overlapped with and adhered to the three surfaces of an upper surface and both side surfaces mainly excluding a lower surface. The can-type member has a form in which the electrode assembly 12 is sealed and accommodated on one surface, that is, a member configured to be mainly in the form in which the electrode assembly 12, while being accommodated inside, is overlapped with and adhered to the one surface mainly excluding the three surfaces of the lower surface and the both side surfaces.

The cell body member 11 may be manufactured to be coupled with the cell conducting member 30 having a contact area A2 with the cooling plate member 21 smaller than a maximum cross-sectional area A1 of the cell body member 11 in the thickness direction X and then provided to be in contact with the cooling plate member 21. This may facilitate a decrease in manufacturing costs and time of a battery module by making it easy to install a plurality of the secondary batteries 10 including the cell body member 11 and the electrode assembly 12 in a housing member 20 including the cooling plate member 21.

Further, to manufacture the heat conductive member 30 to allow the heat conductive member 30, which is formed to have a contact area A2 with the cooling plate member 21 smaller than a maximum cross-sectional area A1 of the cell body member 11 in a thickness direction X, to be coupled to the cell body member 11 followed by attaching the same to the cooling plate member 21, the cell body member 11 may include a tapered portion 11*a* and a contact area portion 11*b*.

That is, the cell body member 11 of the secondary battery 10 according to an example embodiment may include a tapered portion 11*a* in the form in which a cross-sectional area A1 parallel to the thickness direction X decreases toward one end of the tapered portion in contact with the cooling plate member 21; and a contact area portion 11*b* provided at the one end of the tapered portion 11a and forming a smallest cross-sectional area A1 parallel to the thickness direction X.

As described above, the tapered portion 11a, as a portion in which the cross-sectional area A1 of the cell body member 11 is formed to decrease as compared to the maximum cross-sectional area A1 of the cell body member 11 parallel to the thickness direction, is formed with the contact area portion 11b at the end thereof. That is, the tapered portion 11a has the inclined side surfaces and the flat end at which the contact area portion 11b is formed.

According to the above, the contact area A2 smaller than the maximum cross-sectional area A1 parallel to the thickness direction X of the cell body member 11 may facilitate formation of the heat conductive member 30, in contact with the cooling plate member 21.

That is, even in the case in which the heat conductive member 30 is formed by a process of spray-applying, brush-applying a heat conducting material to the contact area portion 11b, the contact area portion 11b is still smaller than the maximum cross-sectional area A1 of the cell body member 11 parallel to the thickness direction X. As such, the heat conductive member 30 formed to correspond to a surface area of the contact area portion 11b can also be formed to be smaller than the maximum cross-sectional area A1 of the cell body member 11 parallel to the thickness direction X, thereby facilitating formation of the heat conductive member 30.

In addition, as described above, the one end of the cell body member 11, in which the contact area portion 11b is formed, may be flat as illustrated in FIG. 1; however, as illustrated in FIG. 4, the one end may be in the form in which a dent 11c is formed. In this case, the contact area portion 11b, in which the heat conductive member 30 is formed, may be a portion of the cell body member 11 excluding the dent 11c.

The electrode assembly 12, as a secondary battery 10, is a battery capable of repeating charging and discharging, due to reversible conversion between chemical energy and electric energy. Any secondary battery 10 conventionally used can be configured as the electrode assembly 12 without limitations. As an example, the electrode assembly 12 may be configured in a manner in which a cathode and an anode are cross-stacked on each other such that surfaces coated with respective electrode active materials face each other while having a separation film as a boundary therebetween.

The electrode assembly 12 includes an electrolyte solution and is received in the cell body member 11 to be used. The electrolyte solution may include an organic solvent such as ethylene carbonate (EC), propylene carbonate (PC), diethyl carbonate (DEC), ethyl methyl carbonate (EMC), dimethyl carbonate (DMC), or the like, together with a lithium salt such as $LiPF_6$, $LiBF_4$, or the like. Further, the electrolyte solution may be liquid, solid, or gel-type.

The cooling plate member 21 serves to release heat generated in the electrode assembly 12 accommodated in the cell body member 11. To this end, the cooling plate member 21 may receive the heat from the cell body member 11 transferred by the heat conductive member 30, or the like, and delivers the heat to an external heat sink S, or the like, thereby being in contact with the external hear sink S such that the cell body member 11 accommodating the electrode assembly 12 therein is cooled.

The heat conductive member 30 serves to deliver the heat generated during charging and discharging of the electrode assembly. To this end, the heat conductive member 30 may be provided between the cell body member 11 accommodating the electrode assembly 12 therein and the cooling plate member 21 in contact with the heat sink S.

The heat conductive member 30 can be configured to smaller by forming the contact area A2 with the cooling plate member 21 to be smaller than the maximum cross-sectional area A1 of the cell body member 11 parallel to the thickness direction X as compared to a case in which the contact area A2 is formed to be the same as the maximum cross-sectional area A1 of the cell body member 11 parallel to the thickness direction X.

In this case, the contact area A2 formed by the heat conductive member 30 may be proposed by adjusting a percentile ratio thereof with respect to the maximum cross-sectional area A1 of the cell body member 11 parallel to the thickness direction X, which will be described with reference to FIGS. 5 and 6 below.

In addition, the heat conductive member 30 of the secondary battery 10 according to an example embodiment of the present disclosure may be contact with the contact area portion 11b and be formed to have the same surface area as the contact area portion 11b.

That is, the heat conductive member 30 can be formed on the contact area portion 11b by spray-applying or brush-applying a heat conducting material. In this case, the heat conductive member 30 may be formed to have the same surface area as the contact area portion 11b. As the contact surface portion 11b is smaller than the maximum cross-sectional area A1 of the cell body member 11 parallel to the thickness direction X, the heat conductive member 30 formed to correspond to the surface area of the contact area portion 11b may be formed to be smaller than the maximum cross-sectional area A1 of the cell body member 11 parallel to the thickness direction X.

The heat conductive member 30 may be manufactured to be coupled to the cell body member 11, which facilitates installment of a plurality of the secondary batteries 10 in the housing member 20, thereby reducing manufacturing costs and time of a battery module.

Further, the heat conductive member 30 of the secondary battery 10 according to an example embodiment is formed to have a constant thickness t2 until it reaches the cooling plate member 21 while having the same cross-sectional area A1 as the contact area portion 11b.

As described above, when the thickness t2 of the heat conductive member 30 is constant, use of the heat conducting material forming the heat conductive member 30 can be minimized while maximally securing a path for heat exchange between the cell body member 11 and the cooling plate member 21.

That is, when the heat conductive member 30 includes a tapered shape in which the cross-sectional area A1 varies parallel to the thickness direction X, a maximum cross-sectional area A1 and a minimum cross-sectional area A1 are formed parallel to the thickness direction X. In this case, the heat exchange path is in the minimum cross-sectional area A1, and accordingly, a portion representing a difference between the maximum cross-sectional area A1 and the minimum cross-sectional area A1 is wasted, resulting in consumption of heat conducting material that serves no purpose. In this regard, the present disclosure is configured to prevent such waste by forming the heat conductive member 30 to be constant parallel to the thickness direction X.

The heat conductive member 30 of the secondary battery 10 according to an example embodiment is in contact with a central portion of one end of the cell body portion 11 adjacent to the cooling plate member 21.

In other words, when the cell body member 11 forms a constant cross-sectional area A1 parallel to the thickness direction X or the end of the cell body member 11 adjacent to the cooling plate member 21 has a larger cross-sectional area A1 as compared to the other end, the cell body member 11 is formed to have a smaller cross-sectional area A1 compared to the end of the cell body member 11. This is the case in which the heat conductive member 30 is formed in the central portion of the end of the cell body member 11.

In such a case, a speed of heat conduction may be increased as compared to a case in which the heat conductive member 30 is biased toward one side from the end of the cell body member 11. In other words, the heat is delivered uniformly in a radiation direction from the central portion of the end of the cell body member 11, the heat conduction speed can be increased as compared to the case of being biased toward one side.

Figure 5A:
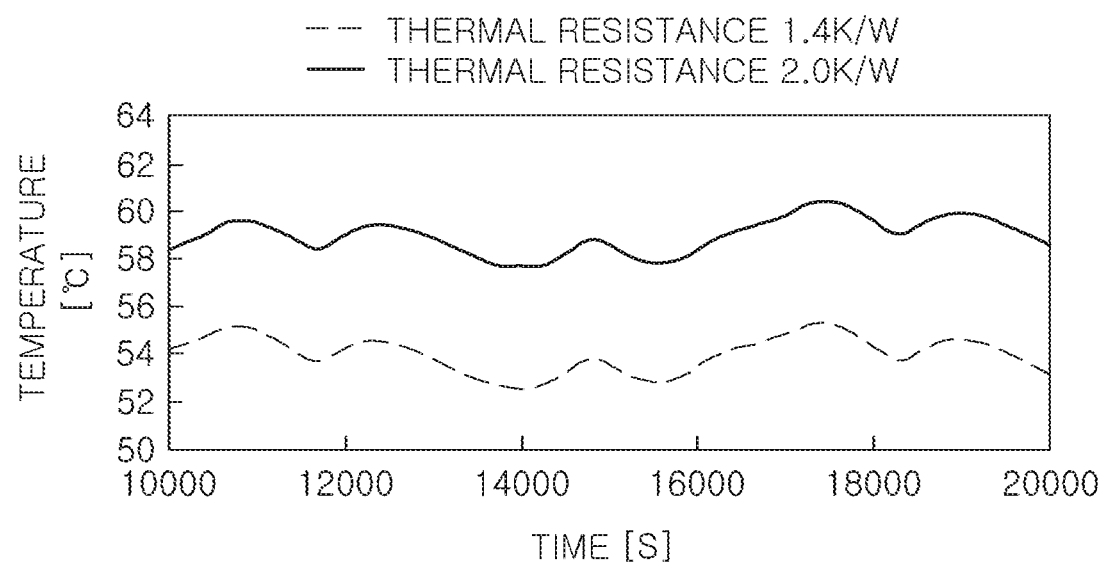
FIG. 5A and FIG. 5B are a graph suggesting optimal thermal resistance of a secondary battery, maintaining an optimal temperature of the secondary battery.
Figure 5B:
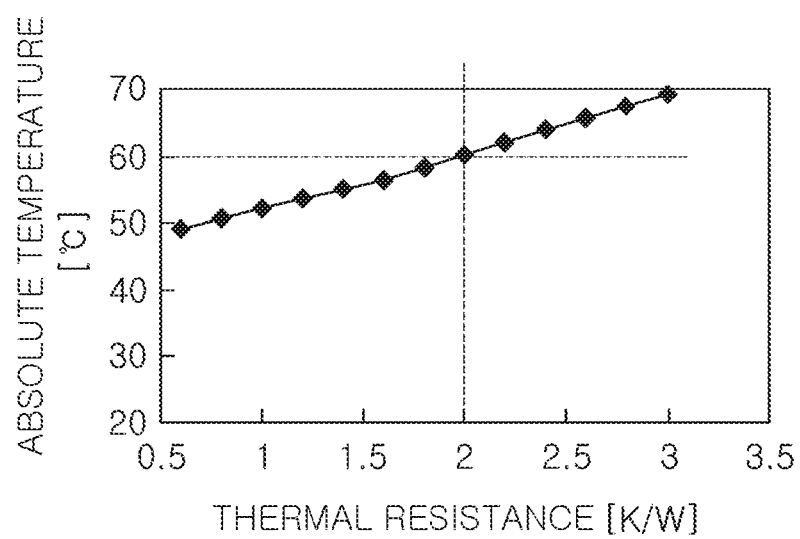
Figure 6:
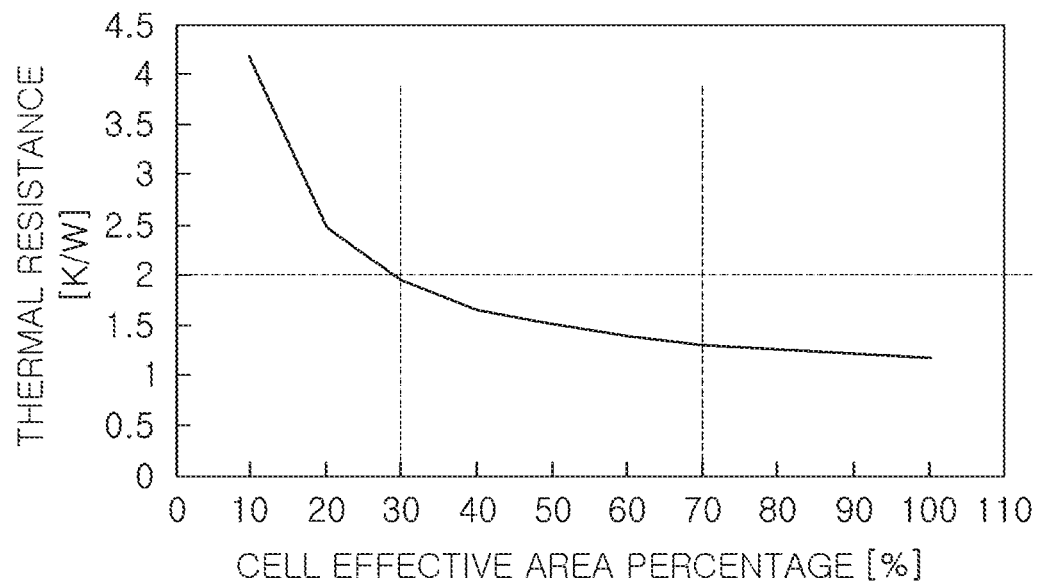
FIG. 6 is a graph illustrating an effective area ratio of a secondary battery cell for optimal thermal resistance of a secondary battery.
Figure 7:
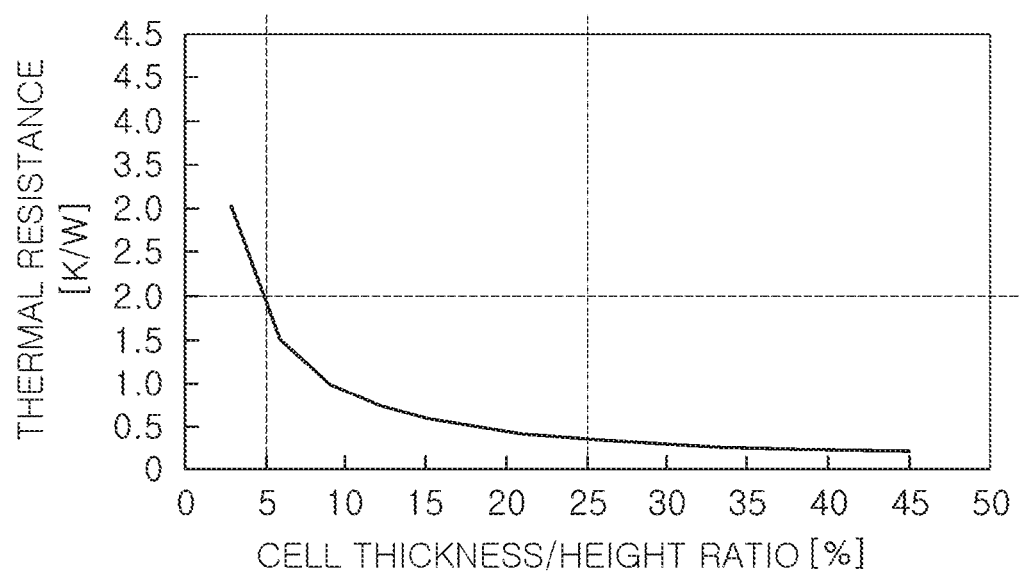
FIG. 7 is a graph illustrating a thickness percentile ratio with respect to a height of a secondary battery cell for optimal thermal resistance of a secondary battery.

FIG. 5A and FIG. 5B are graphs describing optimal thermal resistance of a secondary battery 10, maintaining an optimal temperature of the secondary battery, and FIG. 6 is a graph illustrating an effective area ratio of a secondary battery cell 10 for optimal thermal resistance of a secondary battery while FIG. 7 is a graph illustrating a thickness t1 percentile ratio with respect to a height h of a secondary battery cell 10 for optimal thermal resistance of a secondary battery 10.

In the drawings, the graphs of FIGS. 5 to 7 illustrate a case in which a secondary battery 10 cell having heat conductivity of 5 W/mK to 30 W/mK is used.

Referring to FIGS. 5 to 7, an effective contact area percentage, which is a percentile ratio of a contact area A2 of the cooling plate member 21 and the heat conductive member 30 may be 30% to 70% with respect to a cross-sectional area A1 of at least a portion of the cell body member 11 of the secondary battery 10 according to an example embodiment.

That is, the heat conductive member 30 can be configured with reduced size by forming the contact area A2 with the cooling plate member 21 to be smaller than the maximum cross-sectional area A1 of the cell body member 11 parallel to the thickness direction X as compared to a case in which the contact area A2 is formed to be the same as the maximum cross-sectional area A1 of the cell body member 11 parallel to the thickness direction X. In this case, cooling performance can be maintained by adjusting the percentile ratio of the contact area A2 formed by the heat conductive member 30 with respect to the maximum cross-sectional area A1 of the cell body member 11 parallel to the thickness direction X.

Data of thermal resistance for maintaining the cooling performance are shown in FIG. 5A and FIG. 5B, That is, the thermal resistance for maintaining a temperature below about 60° C., which is an overheating limit of a conventional secondary battery 10, is about 2.0 K/K, and the effective area ratio is defined based thereon.

In this case, the thermal resistance is determined by dividing a temperature increase K of the secondary battery 10 by heat generation W of the secondary battery 10. In other words, the thermal resistance is a value representing the temperature increase according to the heat generation of the secondary battery 10, and is used as an index indicating the cooling performance of the secondary battery 10.

Further, for determination of reference thermal resistance, only the thermal resistance is subject to change while fixing the remaining conditions, which can be variables, to derive the overheated temperature of the secondary battery 10 as a result value.

That is, the thermal conductivity of the secondary battery 10 cell was limited to 5 w/mL to 30 w/mK, and a shape of the cell body member 11 was defined as a pouch-type member in which the electrode assembly 12 is sealed on three surfaces to be accommodated or as a can-type member in which the electrode assembly 12 is sealed on one surface to be accommodated.

In addition, as the heat generation ($RI^2$) for calculating the thermal resistance, 10 W, indicating a case in which input current (I) is 100 A and resistance (R) of the secondary battery 10 cell is 1 mΩ, was applied as an example.

A bottom surface of the cell body member 11 of the secondary battery 10 cell exchanging heat with the cooling plate member 21 was set as a lowest temperature measurement point, and a top surface of the cell body member 11 was set as a highest temperature measurement point to measure highest and lowest temperatures, and a difference therebetween was applied as the temperature increase for calculating the thermal resistance.

According to the above, when the effective contact area percentage of 2.0 K/W thermal resistance is determined, the cell effective contact area percentage may be set to have a lower limit of at least 30% as suggested in FIG. 6. As illustrated in FIG. 6, when the cell effective contact area percentage exceeds 70%, the thermal resistance does not generate a significant change, thereby enabling to set an upper limit of the effective contact area percentage.

Specifically, an effective contact area percentage, which is a percentile ratio of the contact area A2 of the cooling plate member 21 and the heat conductive member 30 may be 35% to 50% with respect to the cross-sectional area A1 of at least a portion of the cell body member 11 of the secondary battery 10 according to an example embodiment.

The further specified effective contact area percentage as the above is resulted from setting 35%, the effective contact area percentage corresponding to about 1.8 K/w, a middle range thermal resistance between about 2.0 K/W, a thermal resistance at a lower limit of 30%, and about 1.3 K/w, a thermal resistance at an upper limit of 70%, as a lower limit and 50%, the effective contact area percentage corresponding to about 1.5 K/w, as an upper limit.

The lower limit of the effective contact area percentage range of 35%, which is further specified as described above, is spaced a certain distance from a threshold of 2 K/W of thermal resistance to secure a stable range of the temperature increase. The upper limit 50% may serve to further reduce a range of the heat conductive member 30 while avoiding a range in which the thermal resistance does not generate any significant change.

It can also be understood that the effective contact area percentage is identical to a percentile ratio of a length t2 of the cooling plate member 21 and the heat conductive member 30 parallel to the thickness direction X with respect to a length t1 of at least the portion of the cell body member 11 parallel to the thickness direction X based on the assumption that the cell body member 11 and the heat conductive member 30 have the same length.

The cell body member 11 of the secondary battery 10 according to an example embodiment may have a percentage of a thickness t1 of 5% to 25% with respect to a height h.

This is a specified cell body member 11 for maintaining the temperature to be 60° C. or lower, the overheating limit of a conventional secondary battery 10.

In other words, the percentile ratio of the thickness t1 with respect to the height h of the cell body member 11 is defined such that the thermal resistance for maintaining a temperature of about 60° C. or low, the overheating limit of the conventional secondary battery 10, is maintained at about 2.0 K/W.

As described above, the percentile ratio of the thickness t1 with respect to the height h of the cell body member 11 is defined as the thermal resistance of 2.0 K/W, the percentile ratio of the thickness t1 with respect to the height h of the cell body member 11 may have a lower limit of 5% or above as suggested in FIG. 7. As illustrated in FIG. 7, when the percentile ratio of the thickness t1 with respect to the height h exceeds 25%, the thermal resistance does not generate a significant change, thereby enabling to set an upper limit of the percentile ratio of the thickness t1 with respect to the height h.

Specifically, the cell body member 11 of the secondary battery 10 according to an example embodiment may have a percentage of a thickness t1 7.5% to 10% with respect to a height h.

The further specified percentage of a thickness t1 with respect to a height h as the above is resulted from setting 7.5%, the percentage of a thickness t1 with respect to a height h corresponding to about 1.5 K/W, a middle range thermal resistance between about 2.0 K/W, a thermal resistance at a lower limit of 5%, and about 0.5 K/W, a thermal resistance at an upper limit of 25%, as a lower limit and 10%, the percentage of a thickness t1 with respect to a height h corresponding to about 1.0 K/W, as an upper limit.

7.5%, the lower limit of the percentage of a thickness t1 with respect to a height h, which is further specified as the above, is spaced a certain distance from a threshold of 2 K/W of thermal resistance to secure a stable range of the temperature increase. The upper limit 10% may serve to form the cell body member to be much slimmer while avoiding a range in which the thermal resistance does not generate any significant change, thereby further increasing stacking efficiency of a plurality of the secondary batteries.

Figure 8:
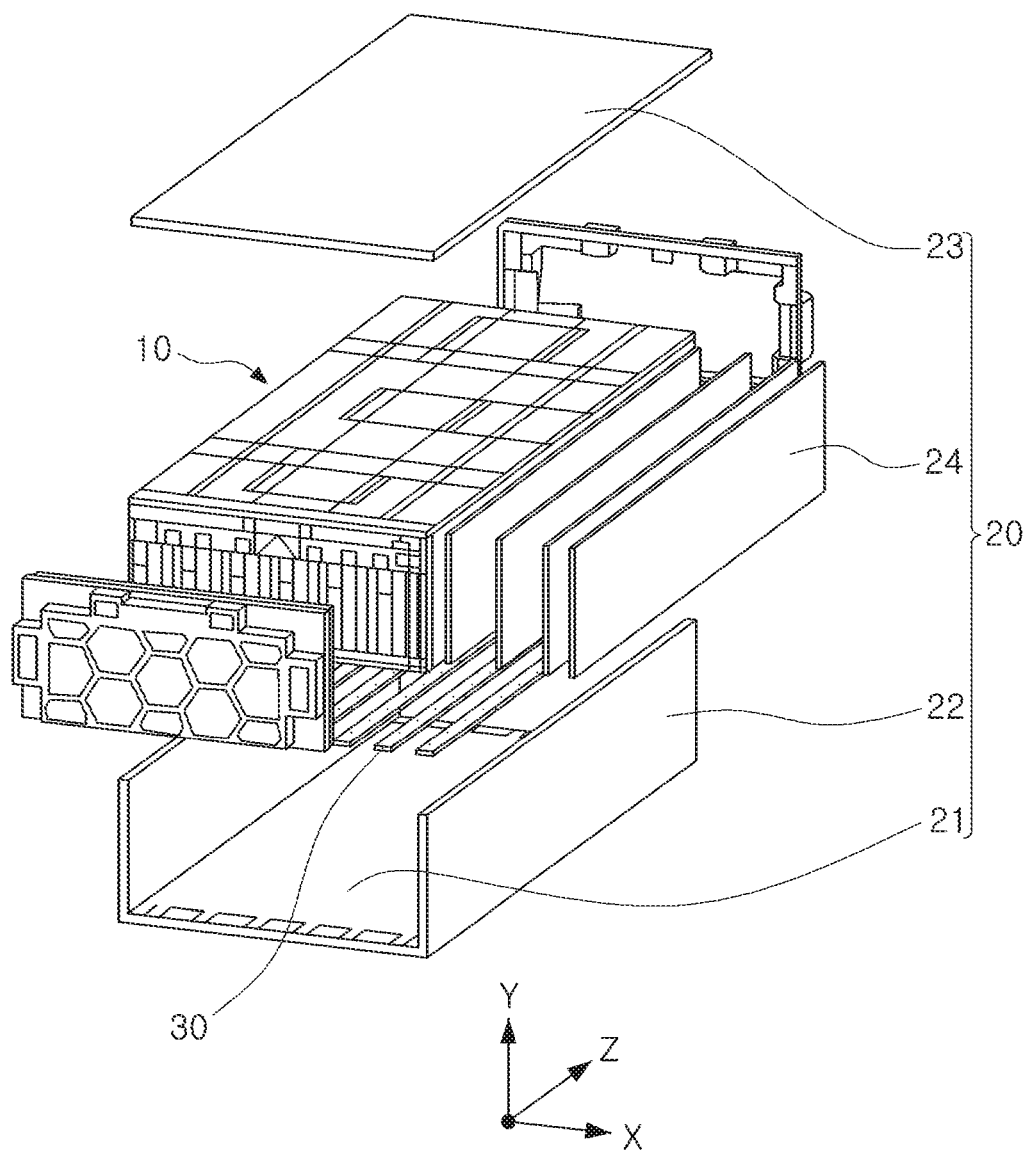
FIG. 8 is a perspective view of a disassembly of a battery module of the present disclosure.

FIG. 8 is a perspective view of a disassembly of a battery module of the present disclosure. Referring to FIG. 8, a battery module according to another example embodiment includes a cell body member 11 accommodating an electrode assembly 12 therein, and a heat conductive member 30 provided between the cell body member 11 and a cooling plate member 21; and a housing member 20 including the cooling plate member 21 for exchanging heat with the cell body member 11 mediated by the heat conductive member 30 and accommodating a plurality of the secondary batteries 10. The heat conductive member 30 may be in contact with the cooling plate member 21 with a contact area A2 smaller than a cross-sectional area A1 of at least a portion of the cell body member 11 in a thickness direction X.

The secondary battery 10 included in the battery module may include the characteristics of the previously described secondary battery 10.

As an example, the secondary battery 10 may be configured to include the cell body member 11 cooled by the cooling plate member 21 mediated by the heat conductive member 30. In this case, the heat conductive member 30 in contact with the cell body member 11 is in contact with the cooling plate member 21 with a contact area A1 smaller than the cross-sectional area A1 of at least a portion of the cell body member 11 parallel to the thickness direction X, thereby reducing consumption of a heat conducting material while maintaining cooling performance.

The cell body member 11 of the battery module according to another example embodiment may include a tapered portion 11a in the form in which a cross-sectional area A1 parallel to the thickness direction X decreases toward one end of the tapered portion in contact with the cooling plate member 21; and a contact area portion 11b provided at the one end of the tapered portion 11a and forming a smallest cross-sectional area A1 parallel to the thickness direction.

As described above, the tapered portion 11a, as a portion in which the cross-sectional area A1 of the cell body member 11 is formed to decrease as compared to the maximum cross-sectional area A1 of the cell body member 11 parallel to the thickness direction, is formed with the contact area portion 11b at the end thereof. That is, the tapered portion 11a has the inclined side surfaces and the flat end at which the contact area portion 11b is formed.

According to the above, the contact area A2 smaller than the maximum cross-sectional area A1 parallel to the thickness direction X of the cell body member 11 may facilitate formation of the heat conductive member 30, which is in contact with the cooling plate member 21. This is the same as the previously described secondary battery 10.

In this case, when a plurality of the secondary batteries 10 are installed in the housing member 20, the heat conductive member 30 connected thereto is also provided in plural. In an embodiment, neighboring heat conductive members 30 are spaced apart forming gaps to provide additional air cooling, thereby further improving the cooling performance.

Due to the configuration in which a plurality of the secondary batteries are installed, the housing member 20 serves to protect the secondary batteries 10 while delivering electric energy generated by the secondary batteries 10 to outside or to an external heat sink S to cool.

Further, a bottom portion forming a lower portion of the housing member 20 may be formed of the cooling plate member 21.

That is, the housing member 20 of the battery module according to another example embodiment may include the cooling plate member 21 at least on the bottom portion.

In addition, a side wall member 22 forming a side portion of the housing member 20 may be provided at an edge of the cooling plate member 21, and the cooling plate member 21 may be formed to extend to it reaches the side wall member 22. A compression member 24 is provided in an inner side surface of the side wall member 22 to further firmly protect the secondary batteries 10.

In addition, the housing member 20 may include a cover member 23 provided on an upper end of the side wall member 22 to protect an upper end of the secondary batteries 10.

The housing member 20 may be provided with an additional configuration, such as a bus bar for electrically connecting the secondary battery 10 to the outside, or the like.

According to the aforementioned example embodiments, the secondary battery and the battery module including the same are advantageous in that cooling performance may be optimally achieved without wasting cost or material of a heat conductive member.

Various advantages and beneficial effects of the present disclosure are not limited to those described above. Other advantages and beneficial effects may be understood in light of the present disclosure.

While example embodiments have been shown and described above, it will be apparent to those skilled in the art that modifications and variations could be made without departing from the scope of the present invention as defined by the appended claims.

What is claimed is:

1. A secondary battery, comprising:
a cell body member accommodating an electrode assembly therein and being sealed on three surfaces; and
a heat conductive member disposed between the cell body member and a cooling plate member to form a heat path for transferring heat from the cell body member,
wherein the cell body member has a form of a pouch-type battery cell,
wherein the three surfaces include an upper surface and both side surfaces of the cell body member,
wherein a dent is formed in a lower surface of the cell body member,
wherein the lower surface of the cell body member is in contact with the heat conductive member,
wherein the heat conductive member is in contact with the cooling plate member,
wherein a contact area of the cooling plate member and the heat conductive member is smaller than a cross-sectional area of the cell body member parallel to a thickness direction of the electrode assembly, and
wherein an effective contact area percentage is 30% to 70%.

2. The secondary battery of claim 1, wherein an effective contact area percentage is 35% to 50%.

3. The secondary battery of claim 1, wherein the cell body member comprises:
a tapered portion of which a cross-sectional area parallel to the thickness direction decreases toward one end of the tapered portion adjacent to the cooling plate member; and
a contact area portion at the one end of the tapered portion and forming a smallest cross-sectional area of the cell body member parallel to the thickness direction.

4. The secondary battery of claim 3, wherein the heat conductive member is in contact with the contact area portion and has a surface area the same as a surface area of the contact area portion.

5. The secondary battery of claim 4, wherein the heat conductive member has a constant thickness until reaching the cooling plate member while having the same cross-sectional area as the contact area portion.

6. The secondary battery of claim 1, wherein the cell body member has a thickness percentile ratio with respect to a height of 5% to 25%.

7. The secondary battery of claim 1, wherein the cell body member has a thickness percentile ratio with respect to a height of 7.5% to 10%.

8. A battery module, comprising:
a plurality of secondary batteries; and
a housing member comprising a cooling plate member for exchanging heat with a cell body member mediated by a heat conductive member and accommodating the plurality of secondary batteries,
wherein each secondary battery comprises the cell body member being sealed on three surfaces and accommodates an electrode assembly therein, and the heat conductive member disposed between the cell body member and the cooling plate member;
wherein the cell body member has a form of a pouch-type battery cell,
wherein the three surfaces include an upper surface and both side surfaces of the cell body member,
wherein a dent is formed in a lower surface of the cell body member, wherein the lower surface of the cell body member is in contact with the heat conductive member,
wherein a contact area between the heat conductive member and the cooling plate member is smaller than a cross-sectional area of the cell body member parallel to thickness direction of the electrode assembly, and
wherein an effective contact area percentage is 30% to 70%.

9. The battery module of claim 8, wherein the cell body member comprises:
a tapered portion having a form in which a cross-sectional area parallel to the thickness direction decreases toward one end of the tapered portion adjacent to the cooling plate member; and
a contact area portion at the one end of the tapered portion and forming a smallest cross-sectional area parallel to the thickness direction.

10. The battery module of claim 8, wherein the cooling plate member is disposed at least in a bottom portion of the housing member.

11. A secondary battery, comprising:
a cell body member accommodating an electrode assembly and comprising a side positioned adjacent to a cooling plate member, the side having a tapered portion ending to a contact area portion; and
a heat conductive member provided between and in contact with the contact area portion and the cooling plate member for transferring heat generated by the electrode assembly to the cooling plate member,
wherein the cell body member has a form of a pouch-type battery cell,
wherein the cell body member is being sealed in three surfaces excepting the side positioned adjacent to the cooling plate member,
wherein a dent is formed in the side of the cell body member,
wherein the heat conductive member is in contact with the side of the cell body member,
wherein the tapered portion has a form in which a cross-sectional area parallel to a thickness direction decreases toward the contact area portion, and
wherein an effective contact area percentage is 30% to 70%.

12. The secondary battery of claim 11, wherein an effective contact area percentage is 35% to 50%.

13. The secondary battery of claim 11, wherein the tapered portion has a form in which a cross-sectional area parallel to the thickness direction decreases toward one end of the tapered portion adjacent to the cooling plate member; and
the contact area portion is disposed at the one end of the tapered portion and forms a smallest cross-sectional area parallel to the thickness direction.

14. The secondary battery of claim 11, wherein the heat conductive member has a constant thickness until reaching the cooling plate member while having the same cross-sectional area as the contact area portion.

* * * * *